March 6, 1962   A. B. CARSON, JR   3,024,434
ELECTROMAGNETIC INDUCTION APPARATUS
Filed Sept. 13, 1957
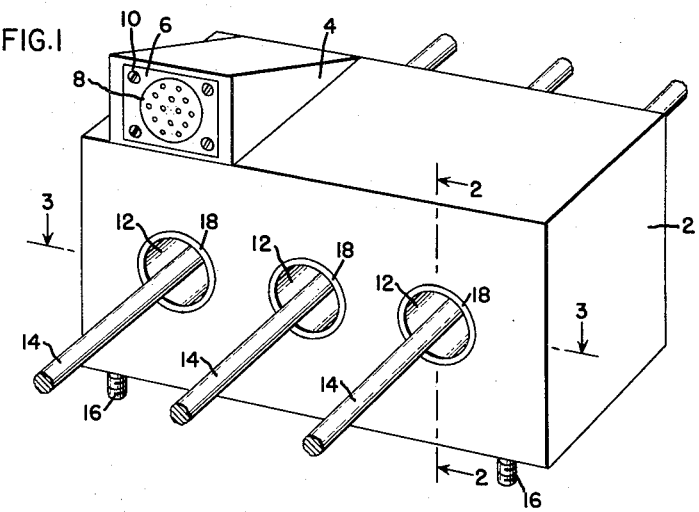
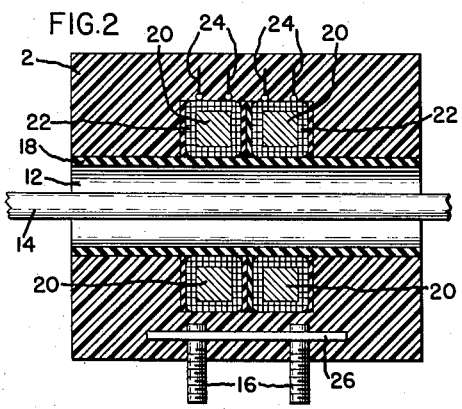
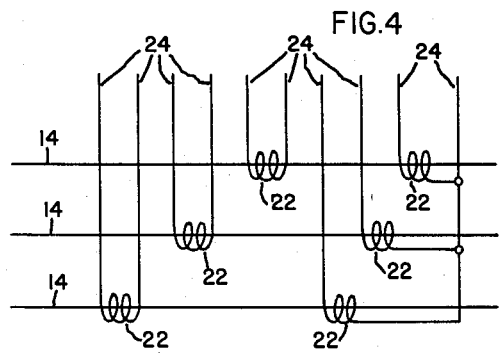
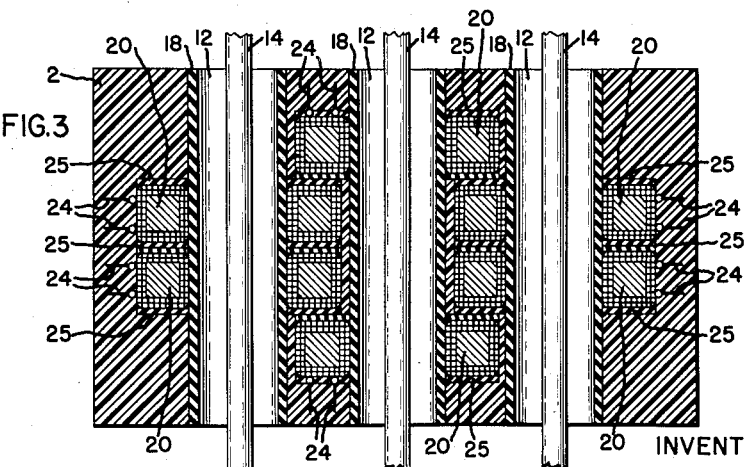
INVENTOR:
ANDREW B. CARSON JR.,
BY *Melvin M. Goldenberg*
HIS ATTORNEY.

United States Patent Office 3,024,434
Patented Mar. 6, 1962

3,024,434
ELECTROMAGNETIC INDUCTION APPARATUS
Andrew B. Carson, Jr., Waynesboro, Va., assignor to General Electric Company, a corporation of New York
Filed Sept. 13, 1957, Ser. No. 683,821
3 Claims. (Cl. 336—96)

This invention relates to an electromagnetic induction apparatus and, more particularly, to improvements in transformers.

Modern aircraft require the provision of an electrical system providing power for a large number of electrical and electronic devices. The output of such electrical systems must be rather closely regulated by systems measuring both load voltage and load current. A usual method of measuring load current in such systems involves the use of current transformers. With the advent of high altitude, high speed aircraft it has been found necessary to provide protection against vibration, shock, moisture and other external influences for such transformers. Various methods have been proposed for encapsulating these devices in plastic materials and mounting them at suitable places on the aircraft structure. Since the space available for such devices is limited, it is desirable to provide as compact and light a mounting for these transformers as is possible. Further, such transformers may be found in portions of an aircraft electrical system apart from that in the regulator and due to the number of such transformers, any saving in weight and size affords decided advantages in the design of the aircraft.

Therefore, it is an object of this invention to provide a novel electromagnetic induction apparatus constituted by a compact unitary structure of cast insulating material which provides insulation and includes means for supporting the apparatus on or about conductors constituting transformer primaries.

Another object of this invention is the provision of a novel electromagnetic induction apparatus including means for making a plurality of transformer connections without the need for extensive supporting or mounting structure for each of the individual transformers or for the apparatus itself.

Still another object of this invention is to provide a novel electromagnetic induction apparatus constituted by a body of cast material in which a plurality of current transformer secondaries may be mounted and through which conductors constituting transformer primaries may be passed.

A still further object of this invention is the provision of a novel electromagnetic apparatus comprising a body of cast material in which a plurality of windings constituting transformer secondaries mounted and provided with passages through which conductors which constitute a primary for one or more of the secondaries may be passed.

Briefly, one embodiment of my invention comprises a body of cast insulating material in which a plurality of passages are provided. A plurality of annular magnetic cores encompass the passages and are provided with windings constituting transformer secondaries and leads extending to a terminal means mounted on the body.

The subject matter which I regard as my invention is particularly pointed out and distinctly claimed in the concluding portion of this specification. My invention, however, both as to its structure and mode of operation together with further objects and advantages thereof may best be understood by reference to the following description taken in connection with the accompanying drawing in which:

FIG. 1 is a view in perspective of an embodiment of my invention;

FIG. 2 is a view along the lines II—II in FIG. 1;

FIG. 3 is a view along the lines III—III in FIG. 1; and

FIG. 4 is a schematic illustration of circuit connections which may be made in a device embodying my invention.

FIG. 1 of the drawing discloses an embodiment of my invention constituted by a body 2 of cast insulating material. Suitable materials for this purpose may be epoxy resins or any material exhibiting suitable electrical and thermal insulation qualities. In this form of my invention, the material is cast to include a portion 4 molded around a terminal support means 6 to which a suitable terminal 8 is mounted and which in turn is secured to the body 2 as by means of the threaded screws 10. The body has provided therein a plurality of passages 12 extending therethrough whereby it may be mounted to encompass current-carrying conductors 14, which conductors will function as the primaries of transformers in a manner to be described hereinafter. As may be seen from an inspection of the drawing, the conductors 14 have a cross sectional area less than that of the passages 12. The conductors may be the buses extending from an alternating current generator and in the illustrated embodiment take the form of a three-phase system. Also extending from the body 2 are supports shown in this embodiment as the threaded element 16 in order that the induction apparatus may be secured to a mounting means.

In FIG. 2 of the drawing, passages 12 are shown as lined with tube-like elements 18 of insulating material in order that the passage may be formed during the molding operation. Embedded in the body of the apparatus are a plurality of annular cores 20 formed from a suitable magnetic material. Around each core a winding 22 is provided, each winding having a pair of leads 24 extending so as to make contact with the terminal device 8. The mounting devices 16 are shown as being supported on a plate 26 also molded in the body 2.

In the construction of the apparatus, the cores 20 may be passed over the tubes 18 and held in place by a slight frictional type of engagement. In order to mold the illustrated embodiment, the center tube 18 and cores 20 (see FIG. 3) may be placed between the outer tubes 18 and cores 20 and a retaining means such as a nylon cord passed through the center tube and pulled tight so that the cores 20 on the center tube 18 bear against the cores on the outer tube to hold them in position while plastic material is cast around them. A disc 25 of electrically insulating material is provided between the cores 20 to maintain them separated from each other.

FIG. 3 of the drawing discloses one possible arrangement for the cores 20 and coils 22 constituting the secondaries of the transformers forming a part of the apparatus, while FIG. 4 illustrates various circuit connections which may be made with the secondary windings 27. In this embodiment, the conductors 14 are inductively connected to the secondary windings through the flux in the cores 20 and signals proportional to the current in each of the conductors 14 is thereby obtained. In the left-hand portion of FIG. 4, the transformer secondaries 22 are shown with the leads 24 extending therefrom so that the connections may be made at the terminal 8, while the right-hand portion illustrates a Y connection. It should be understood that the arrangements illustrated in FIG. 3 and also in FIG. 4 are for the purpose of illustration only as any suitable arrangement of primaries and secondaries may be utilized. It should be understood that apparatus embodying my invention may have utility wherever protection against external disturbances such as shock and moisture may exist although their particular application, as pointed out, may be in aircraft.

Although in accordance with the provisions of the patent statutes the principle of this invention has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. An inductive device adapted to be coupled to a plurality of conductors in a polyphase electrical system comprising a body of cast insulating material having a plurality of passages extending therethrough, a tube of electrically insulating material secured in each of said passages whereby a plurality of current carrying conductors having a cross-sectional area less than the internal cross-sectional area of said tubes may be passed through said tubes and constitute transformer primaries, at least one annulus of magnetic material encompassing each of said tubes and embedded in said body, and a winding encompassing each of said annuli and having leads extending therefrom, each winding having its leads embedded in said body and extending toward the outer surface thereof.

2. An inductive device as defined in claim 1 wherein a terminal means is mounted on said body connected with said leads and provided with members externally available whereby electrical connections may be made to said leads.

3. An inductive device as defined in claim 1 including means embedded in said body and extending therefrom for mounting said body on a support.

References Cited in the file of this patent
UNITED STATES PATENTS

| | | |
|---|---|---|
| 1,130,260 | Dann | Mar. 2, 1915 |
| 2,327,774 | Dickinson | Aug. 24, 1943 |
| 2,618,689 | Cook | Nov. 18, 1952 |
| 2,929,037 | Breth et al. | Mar. 15, 1960 |

FOREIGN PATENTS

| | | |
|---|---|---|
| 822,270 | Germany | Oct. 11, 1951 |